United States Patent
Vo et al.

(10) Patent No.: US 8,313,818 B2
(45) Date of Patent: Nov. 20, 2012

(54) THERMAL INSULATING PANEL COMPOSITE

(75) Inventors: Van-Chau Vo, Souffelweyersheim (FR); Myron J. Maurer, Saginaw, MI (US); Friedhelm Bunge, Achern (DE); Holger H. Merkel, Rodgau (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/377,975

(22) PCT Filed: Jul. 15, 2010

(86) PCT No.: PCT/US2010/042035
§ 371 (c)(1),
(2), (4) Date: Dec. 13, 2011

(87) PCT Pub. No.: WO2011/016961
PCT Pub. Date: Feb. 10, 2011

(65) Prior Publication Data
US 2012/0114895 A1    May 10, 2012

Related U.S. Application Data

(60) Provisional application No. 61/229,410, filed on Jul. 29, 2009.

(51) Int. Cl.
*B32B 3/08* (2006.01)
(52) U.S. Cl. ..... 428/69; 428/218; 428/310.5; 428/318.4
(58) Field of Classification Search .................. 428/69, 428/218, 310.5, 318.4
See application file for complete search history.

(56) References Cited

U.S. PATENT DOCUMENTS

| | | | | |
|---|---|---|---|---|
| 4,513,041 A | * | 4/1985 | Delluc | 428/69 |
| 4,668,555 A | * | 5/1987 | Uekado et al. | 428/69 |
| 5,108,833 A | * | 4/1992 | Noguchi et al. | 428/310.5 |
| 6,001,450 A | * | 12/1999 | Tanimoto et al. | 428/69 |
| 2009/0062410 A1 | | 3/2009 | Maurer et al. | |
| 2009/0136703 A1 | * | 5/2009 | Carolan et al. | 428/55 |

FOREIGN PATENT DOCUMENTS

| | | |
|---|---|---|
| CH | 687450 | 12/1996 |
| DE | 202004010695 | 9/2005 |
| DE | 202007014565 | 1/2009 |
| EP | 1213406 | 6/2002 |
| EP | 1500752 | 1/2005 |
| WO | 9711842 | 4/1997 |

* cited by examiner

*Primary Examiner* — Alexander Thomas
(74) *Attorney, Agent, or Firm* — Steven W. Mork

(57) ABSTRACT

Prepare an article by providing an extruded thermoplastic polymer foam having a cavity defined therein and placing a vacuum insulation panel entirely within the cavity.

11 Claims, 2 Drawing Sheets

THERMAL INSULATING PANEL COMPOSITE

CROSS REFERENCE STATEMENT

This application claims the benefit of U.S. Provisional Application No. 61/229,410, filed Jul. 29, 2009, the entire content of which is incorporated herein by reference.

BACKGROUND OF THE INVENTION

1. Field of the Invention

The present invention relates to an article comprising a vacuum insulation panel within extruded thermoplastic polymeric foam and a process for preparing such an article.

2. Description of Related Art

Thermal insulating panels offer thermal barrier properties desirable for enclosures having regulated temperatures, including houses, offices, refrigerated containers and the like. Extruded polymer foam articles such as polystyrene foam boards are common thermal insulation materials for use in such enclosures including building and construction applications as well as thermal insulation containers. Extruded polymer foam articles are easy to handle and shape at a job site and are a familiar material to those in the construction field. Even so, it is desirable to have a polymer foam-like article that has a lower thermal conductivity than present polymer foam.

Halogenated blowing agents are desirable for preparing extruded thermoplastic polymer foams for thermal insulation at least partially because halogenated molecules provide foam having a low thermal conductivity. However, there are increasing regulations on the use of halogenated molecules for applications such as blowing agents due to perceived harm such molecules have on the environment. Of particular concern is ozone depletion potential (ODP) and greenhouse warming potential (GWP) of halogenated molecules. Identifying blowing agents that have thermal conductivities as low as halogenated molecules is a tremendous challenge. As a result, it is increasingly more difficult to manufacture thermally insulating extruded thermoplastic polymer foams having desirably low thermal conductivities.

Vacuum insulation panel (VIP) articles are one type of thermal insulating material that has an extremely low thermal conductivity. VIPs comprise a vapor impermeable material (barrier material) that encloses an evacuated space containing an internal matrix material. The vapor impermeable material is typically a metal sheet or a film. The polymer film usually includes a metal coating on the inside and/or outside surface to reduce gas permeability through the film. The internal matrix material is a low density porous material such as open-celled foam or porous particulate material. The internal matrix material maintains spacing within the vapor impermeable material enclosure. That spacing is under vacuum, the vacuum serving as an optimal thermally insulating barrier through the VIP.

VIPs offer attractive thermal insulating properties, but suffer from weaknesses as well. The vapor impermeable material that encompasses the VIP can serve as a thermal short from one side of the VIP to the other. Thermally conducting materials such as metals, which can server as strong vapor impermeable enclosures, also serve as efficient thermals shorts across the VIP barrier. Polymer films containing a thin metal coating are more common as vapor impermeable enclosures for VIPs and offer a less efficient thermal short across the VIP. Polymer films, however, are relatively fragile and upon puncturing or breaching would relieve the vacuum in the VIP and destroy the major thermal barrier properties of the VIP. Despite these weaknesses of VIPs there are methods for using VIPs in building and construction applications.

WO97/11842 offers an enhanced insulation panel comprising a VIP and a frame around the periphery of the VIP to protect the VIP during handling. The frame can be polymeric material, even a polymer foam material.

EP1213406 discloses a thermally insulating wall that contains VIPs between layers of other elements.

EP1500752A2 discloses a thermally insulating element containing a VIP and a protecting layer as well as a fastening element to affix the elements to a building surface.

DE202007014565 discloses a thermally insulating system containing VIPs between layers of other elements.

It would advance the art of thermal insulating panels to provide a panel that has the appearance and feel of extruded polymeric foam and that handles like extruded polymeric foam but that further enjoys thermally insulating properties more like VIPs. Moreover, it would be desirable to have such a panel that contains VIPs but that concomitantly provides localized protection of the VIPs and optimal thermal insulation properties around the VIPs to preclude thermal shorting by the VIP vapor impermeable barrier enclosures.

BRIEF SUMMARY OF THE INVENTION

The present invention provides a solution to the problem of providing a panel that has the appearance and feel of extruded polymeric foam and handles like extruded polymeric foam but that further enjoys thermally insulating properties more like VIPs. Moreover, the present invention further offers a solution to achieving such a panel that contains VIPs but that concomitantly provides localized protection of the VIPs and optimal thermal insulation properties around the VIPs to preclude thermal shorting by the VIP vapor impermeable barrier enclosures. Yet more, embodiments of the present invention offer a solution to achieving any or all of these previous problems without using or containing a halogenated blowing agent, in particular an ability to provide an insulating foam article having a thermal conductivity of 35 milliwatts per meter per Kelvin (mW/m*K) or less without use of halogenated blowing agents.

The present invention provides a VIP within extruded polymeric foam. Surprisingly, the present invention can provide a VIP within polymeric foam in a manner that provides locally higher mechanical strength in the polymeric foam between the VIP and outer surface of the panel to provide enhanced protection of the VIP.

In a first aspect, the present invention is an article comprising an extruded thermoplastic polymer foam that has a thermoplastic polymer matrix defining a multitude of cells, the extruded thermoplastic polymer foam defining at least one cavity; and a vacuum insulation panel residing entirely within at least one cavity of the extruded thermoplastic polymer foam.

In a second aspect, the present invention is a process for preparing the article of first aspect, the process comprising: (a) providing a first extruded polymeric foam having a cavity defined therein; and (b) placing a vacuum insulation panel entirely within the cavity.

The process of the present invention is useful for preparing the article of the present invention. The article of the present invention is useful for thermally insulating structures and containers.

DETAILED DESCRIPTION OF THE INVENTION

Figure 1:
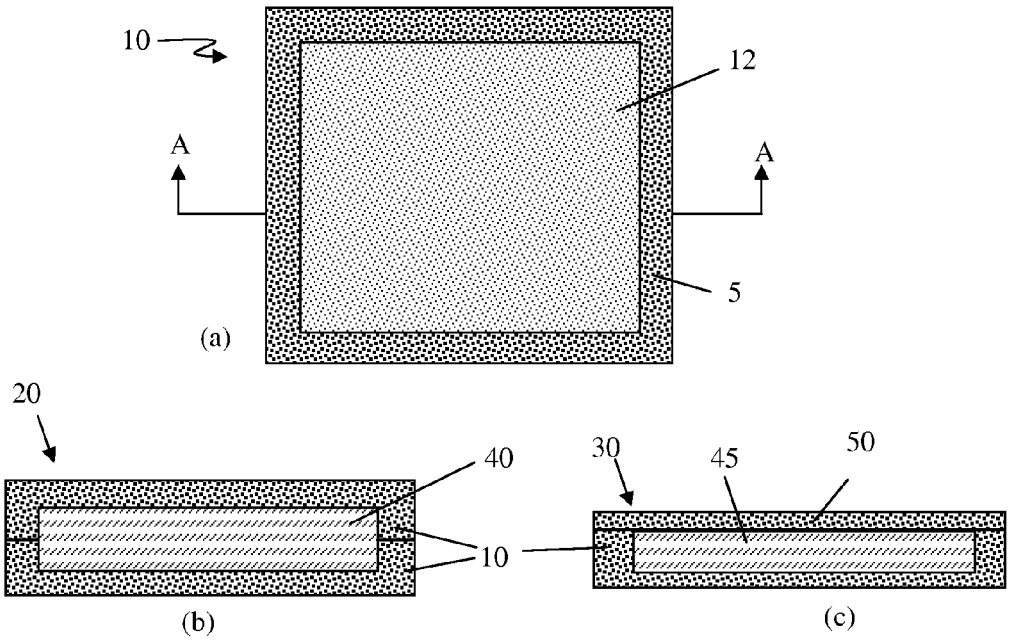
FIGS. 1a-c illustrates thermoplastic polymer foam and two embodiments of articles of the present invention.

"Cavity" is a hollow space in a material. For the sake of the present invention, a hole extending all the way through a material falls outside the scope of the term "cavity". A cavity as used herein generally is like a cave or indentation in a material. A cavity can be entirely enclosed by a material. For example, a cavity can be a void entirely enclosed by extruded thermoplastic polymer foam. A cavity in a material generally is in a form of a depression in the material. Notably, foam cells are cavities defined in a polymer matrix—but are not considered cavities defined in a polymer foam. The article of the present invention includes a "cavity defined in a polymer foam". Foam cells do not meet that definition as they are defined in a polymer matrix and are necessary features to define a polymer foam. A cell cannot be defined in a structure that itself is defined by the cell. A cavity defined in a polymer foam can have dimensions exceeding ten and even 100 foam cells.

"Primary surface" is a surface of an article that has a planar surface area equal to or greater than any other surface of the article. Planar surface area refers to the area of a surface as projected onto a plane and does not take into account surface area due to peaks and valleys on a surface. Nonetheless, a primary surface can be planar or non-planar. For example, a primary surface can contain grooves, bumps, or any other contour.

Length, width and thickness are mutually orthogonal dimensions of an article. Length is a dimension of an article equal to the largest dimension. In an extruded article such as extruded foam, length generally extends along the extrusion direction of the foam. Width is equal to or larger in magnitude than the thickness. In a board-like article, thickness extends from a primary surface of the article to a surface opposing the primary surface.

ASTM refers to American Society for Testing and Materials. EN refers to European Norm. Both ASTM and EN reference test methods. Reference to test methods in the present document refers to the most recent test method prior to the priority date of this document unless otherwise noted. Test methods herein may specify a year of the test method as a suffix to the test number.

Multiple means "two or more". "And/or" means "and, or as an alternative to." All ranges include endpoints unless otherwise noted.

The article of the present invention comprises extruded thermoplastic polymer foam that defines at least one cavity. Extruded thermoplastic polymer foam is a particular type of foam that has been prepared by extruding a thermoplastic foamable polymer composition in a softened state through a die from a zone at a foaming pressure and temperature to an environment at a pressure below foaming pressure and typically below the foaming temperature. The foamable polymer composition expands and cools to form extruded thermoplastic polymer foam. Extruded thermoplastic polymer foam has characteristics unique from other types of polymer foams such as thermoset foam and expanded bead foams.

Thermoset foams are not reversibly softenable like extruded thermoplastic polymer foam. Once foamed and cured, thermoset foam can be crushed but not melted. In contrast, extruded thermoplastic polymer foam has a continuous thermoplastic polymer phase and as a result can melt or soften.

Expanded bead foams comprise a multitude of foamed beads affixed to one another. Each foamed bead has a skin that defines the bead. The skin of one bead is affixed to adjoining beads to form expanded bead foam. Each of the foamed beads is evident in a cross section of the expanded bead foam due to the skin that surrounds the foam cells of each foam bead. Bead skins form a three-dimensional network throughout expanded bead foam that encapsulates localized groups of foam cells that make up each expanded bead. Often, the three-dimensional skin network is porous, which can undesirably result in moisture being drawn into and throughout the foam through the porous skin network. Extruded thermoplastic polymer foam, in contrast, is free of a three dimensional network of skins that encapsulate localized groups of foam cells. As a result, extruded thermoplastic polymer foam can be a better thermal insulator than expanded bead foam due to the extruded thermoplastic polymer foam's absence of such a three dimensional network that can serve as a thermal short connecting surfaces of the foam to one another.

The extruded thermoplastic polymer foam of the present invention comprises a continuous thermoplastic polymer that defines a multitude of cells. The thermoplastic polymer can be any one or combination of more than one extrudable thermoplastic polymer. Desirably, the thermoplastic polymer is one or a combination of more than one polymer selected from alkenyl aromatic polymers and olefinic polymers. Suitable alkenyl aromatic polymers include homo- and copolymers of styrene or substituted styrene. Particularly desirable alkenyl aromatic polymers include styrene homopolymer and styrene-acrylonitrile copolymer. Desirable olefinic polymers include ethylene and propylene homo- and copolymers.

The continuous thermoplastic polymer can have dispersed therein additives and fillers. Suitable additives and fillers include: infrared attenuating agents (for example, carbon black, graphite, metal flake, titanium dioxide); clays such as natural absorbent clays (for example, kaolinite and montmorillonite) and synthetic clays; nucleating agents (for example, talc and magnesium silicate); flame retardants (for example, brominated flame retardants such as hexabromocyclododecane and brominated polymers, phosphorous flame retardants such as triphenylphosphate, and flame retardant packages that may including synergists such as, or example, dicumyl and polycumyl); lubricants (for example, calcium stearate and barium stearate); and acid scavengers (for example, magnesium oxide and tetrasodium pyrophosphate). The total concentration of additives and/or fillers can be up to 20 weight-percent (wt %), preferably up to 15 wt % and more preferably up to 10 wt %. The amount of additives and/or fillers can be 0.05 wt % or more and even 0.1 wt % or more, even 0.2 wt % or more. Wt % of additives and/or filler is relative to total weight of continuous thermoplastic polymer.

The cells of the extruded thermoplastic polymer foam can be open celled or closed celled. The extruded thermoplastic polymer foam can have an average open cell content of 30% or less, 20% or less, 10% or less, 5% or less and even 2% or less. A low extent of open cells inhibits air movement from one cell to another and thereby reduces thermal conductivity through the foam. Alternatively, the extruded thermoplastic polymer foam can be open celled foam having an average open cell content of more than 30%, even 50% or more. Measure average open cell content according to ASTM method D6226-05.

The extruded thermoplastic polymer foam can have a uniform open cell content or a graduated open cell content. For example, it is desirable to have a graduated open cell content to cold form cavities into the foam where the gradient extends from greater open cell content on a surface into which the cavity is formed to a lower open cell content proximate to a surface opposite the surface into which the cavity is formed. It is desirable to have a higher degree of open cells proximate to the surface experiencing most compression to enable gas pressure that would otherwise build up in cells during compression to dissipate to neighboring cells. Meanwhile, having a higher degree of closed cells proximate to the side opposing that side being compressed is desirable to obtain better barrier properties (for example, vapor barrier properties) and strength than is achievable with open cells. Having a gradient in open cell content as described allows the foam to simultaneously facilitate compression molding a cavity while providing optimal barrier properties and strength in the opposing surface to protect the cavity contents (for example, a VIP).

The cells desirably have an average cell size of less than two millimeters, preferably one millimeter or less, more preferably 500 micrometers or less, still more preferably 200 micrometers or less and can be 100 micrometers or less. Smaller cell sizes are desirable for optimal thermal insulating properties. Typically, the cells have an average cell size of 10 micrometers or greater. Determine average cell size according to ASTM D-3576-98.

The cells of the extruded thermoplastic polymer foam can contain blowing agent. Desirably, the cells are free of chlorinated blowing agent and more desirably free of halogenated blowing agent.

The extruded thermoplastic polymer foam desirably has an average density of 48 kilograms per cubic meter ($kg/m^3$) or less, preferably 40 $kg/m^3$ or less, more preferably 35 $kg/m^3$ or less and still more preferably 32 $kg/m^3$ or less. Lower density foam typically has a lower thermal conductivity than higher density foam. Typically, the extruded thermoplastic polymer foam has an average density of 16 $kg/m^3$ or higher in order to posses structural integrity during handling and protection of a VIP within a cavity defined by the thermoplastic polymer foam. Measure average density according to ASTM D1622-08 (Standard Test Method of Apparent Density of Rigid Cellular Plastics).

The foam can have a graduated density, which is desirable when cold forming a cavity into the foam. For example, it is desirable to have a graduated density to cold form cavities into the foam where the gradient extends from lower density proximate to a surface into which the cavity is formed to a higher density proximate to a surface opposite the surface into which the cavity is formed. It is desirable to have a lower density proximate to the surface experiencing compression to facilitate local buckling and collapse of the foam cell walls during compression. Lower density foam has less wall mass, and less wall strength. Therefore, it is easier to compress lower density foam. It is desirable to simultaneously have a higher density foam proximate to the side opposite the side being compressed to achieve maximum strength and barrier properties between that surface of the foam and the cavity in order to optimally protect contents of the cavity (for example, a VIP in the cavity). A gradient in density allows one to both readily compress the lower density side while obtaining maximum strength on the opposing side at the same time.

Desirably, the extruded thermoplastic polymer foam has a compressive strength of 100 kiloPascals (kPa) or higher and a compressive modulus of two megaPascals (MPa) or higher according to EN-826. Higher compressive strengths and moduli are desirable to provide greater protection of VIPs.

Desirably, the extruded thermoplastic polymer foam has a water vapor permeability of less than 10 nanograms per meter per second per Pascal ($ng/m*s*Pa$), preferably less than 5 $ng/m*s*Pa$ and most preferably less than 3 $ng/m*s*Pa$. Measure water vapor permeability according to EN12086.

The extruded thermoplastic polymer foam defines at least one cavity and can define multiple cavities. The cavity is a depression within the extruded thermoplastic polymer foam in which another object may reside. The cavity, or cavities, can have dimensions of any size that fit within extruded thermoplastic polymer foam. Typically, the cavities are depressions in a primary surface of the extruded thermoplastic polymer foam but can be depressions in other surfaces or combination of surfaces as well. Alternatively, the cavities can be depressions solely in a primary surface of a foam. A cavity can be a depression formed into an extruded thermoplastic polymer foam or a void defined by combining extruded thermoplastic polymer foam elements to define cavities (for example, gluing foam walls together on a surface of a foam in a manner so as to define a cavity within the walls). The extruded thermoplastic polymer foam elements that define one or more cavity can be a single extruded thermoplastic polymer foam or a combination of multiple extruded thermoplastic polymer foams, wherein the multiple extruded thermoplastic polymer foams can be the same or different in composition. For example, extruded polyolefin foam walls can be affixed to extruded polyalkenylaromatic polymer foam to create extruded thermoplastic polymer foam that defines one or more cavity.

The article of the present invention further comprises a vacuum insulation panel (VIP) residing within a cavity of the extruded thermoplastic polymer foam. VIPs are well known in the art and, in general, comprise a barrier material enclosing a volume that is under vacuum and generally occupied by a core material. Barrier materials benefit by being as impermeable to gas and vapor as possible so that the vacuum within the barrier lasts as long as possible. Barrier materials can be rigid (for example, metal sheet) or flexible (for example, polymer film and metalized polymer film). Flexible barrier materials are generally cheaper and enable a less expensive manufacturing process for a VIP. However, flexible barrier materials are usually more easily breached, thereby relieving the vacuum in a VIP and obviating the majority of insulation benefit for the VIP. In the present invention, however, flexible barrier materials are protected by extruded thermoplastic polymer foam. Core materials serve to retain spacing within flexible barrier materials to define a volume under vacuum. Without the core material flexible barrier materials would simply collapse on themselves under vacuum. Core materials can be of any composition and form. Common core materials include open-celled porous substances such as open celled polymeric foam. The present invention is not limited to any particular VIP, however it offers benefits of protection for particularly fragile VIPs such as those comprising a thin or flexible barrier material.

Desirably, the VIP resides entirely within a cavity, meaning that an insulating material can be set over the cavity and contact the surface of the extruded thermoplastic polymer foam in which the cavity resides all around the periphery of the cavity containing the VIP. Extruded thermoplastic polymer foam provides optimal protection of the VIP when the VIPs reside entirely within a cavity of extruded thermoplastic polymer foam, especially when the VIP is enclosed within extruded thermoplastic polymer foam. The VIP is desirably enclosed within the cavity in which it resides. For example, desirably at least 5 millimeters, preferably at least 10 millimeters, more preferably at least 15 millimeters of extruded thermoplastic polymer foam encloses (separates from outside of the article) the VIP so as to provide optimal protection of VIP.

There are numerous configurations for extruded thermoplastic polymer foam having a cavity that contains a VIP residing in it wherein the VIP is enclosed within the cavity and they all fall within the broadest scope of the present invention.

It is within the scope of the present invention for the extruded thermoplastic polymer foam to define or have attached thereto a flap or hinged portion that covers a cavity. In one position the hinged portion or flap reveals cavity and in another position the hinged portion or flap covers the cavity and a VIP within the cavity. Such a hinged portion or flap can be sealed over the cavity using an adhesive or other fastener.

Figure 2:
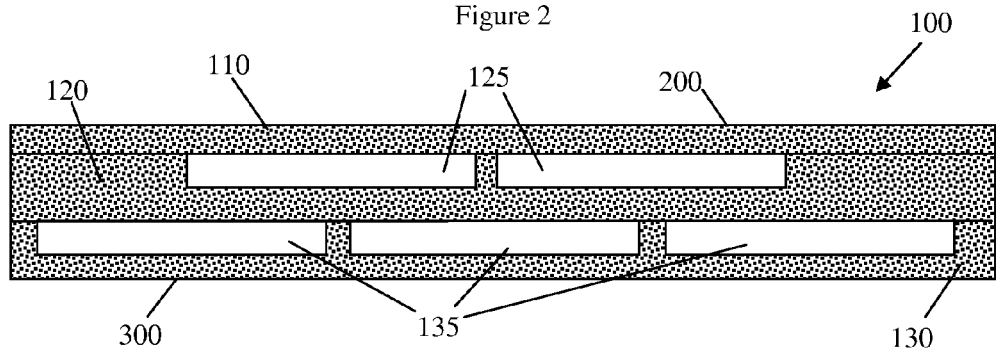
FIG. 2 illustrates an extruded thermoplastic foam article comprising cavities in a staggered layered orientation.
Figure 3:
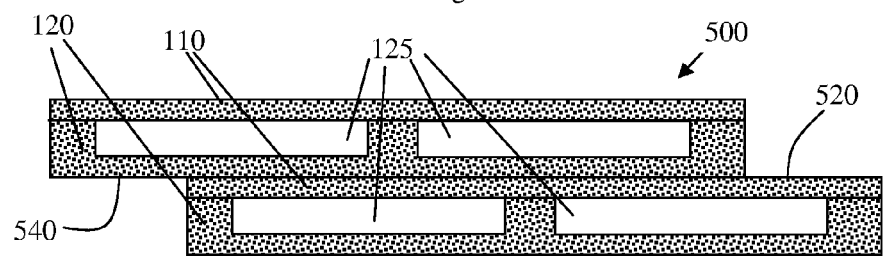
FIG. 3 illustrates an extruded thermoplastic foam article comprising cavities in a staggered layered orientation and further having half-lap profiles on the edges.

In one desirable embodiment, the article of the present invention comprises a mating component that encloses at least one cavity, preferably all cavities in the extruded thermoplastic polymer foam. The mating component can be the same or different in composition and/or properties as the extruded thermoplastic polymer foam. For example, the mating component can be extruded thermoplastic polymer foam of equivalent composition to the extruded thermoplastic polymer foam defining the cavities. To assist in understanding these embodiments, FIGS. 1-3 provide illustration of exemplary articles of the present invention.

FIG. 1(*a*) illustrates extruded thermoplastic polymer foam 5 defining square cavity 12 to form cavity foam 10. FIG. 1(*a*) provides a view of cavity foam 10 as viewing directly down onto a primary surface of polymer foam 5 into which cavity 12 is defined.

FIG. 1(*b*) illustrates a cross-sectional view of article 20, an article of the present invention comprising two mating cavity foams 10, one inverted with respect to the other so that cavity 12 of each cavity foam 10 aligns with cavity 12 of the other cavity foam 10, completely enclosing a cavity having twice the volume of each cavity 12 within extruded thermoplastic polymer foam. The cross sectional view is perpendicular to the view of FIG. 1(*a*) and is generally viewed along viewing line A of FIG. 1(*a*). VIP 40 resides within and fully occupies the cavity created by the two cavities 12.

FIG. 1(*c*) illustrates a similar cross sectional view of article 30, an article of the present invention comprising one cavity foam 10 and extruded polymer foam sheet or board 50 residing over and enclosing cavity 12. VIP 45 resides within cavity 12 and is entirely enclosed within extruded thermoplastic polymer foam.

There is no limit as to the number of layers of enclosed VIPs that maybe in a single article. For example, in one embodiment the article of the present invention comprises a first set of multiple vacuum insulation panels next to one another and residing in a first plane of the article and a second set of multiple vacuum insulation panels positioned so to overlap two or more vacuum insulation panels of the first set and residing in the article in a position other than in first plane. FIG. 2 illustrates such a configuration. FIG. 2 illustrates article 100 comprising three extruded thermoplastic foams: 110, 120 and 130. Foam 130 defines three cavities (135) and foam 120 defines two cavities (125). Foam 120 resides against foam 130 so as to enclose cavities 135. Foam 110 resides against foam 120 so as to enclose cavities 125. Desirably, foams 130 and 110 are affixed to foam 120, preferably by adhesive. Cavities 125 are staggered with respect to cavities 135 so as to minimize the direct pathways through foam from surface 200 to surface 300 of article 100. One or any combination of more than one, preferably all cavities 125 and 135 desirably contain and more desirably are filled by VIP articles in order to form an article of the present invention. An advantage to having layers of staggered VIPs in a single article is to achieve lower thermal conductivities through the article by placing a VIP barrier between what otherwise would be an extruded thermoplastic polymeric foam pillar extending from one surface to an opposing surface of the article. A VIP will have a lower thermal conductivity than the extruded thermoplastic polymer foam pillar so such a configuration should reduce thermal conductivity through where there would otherwise only be a foam pillar.

FIG. 3 illustrates yet another extruded thermoplastic foam article that, when one cavity or any combination of more than one of the cavities in the article contain a VIP, becomes an article of the present invention. Article 500 is particularly desirable because it has mating lip structures (half-lap joint features) 520 and 540 on at least two opposing edges to facilitate aligning an mating neighboring articles together to achieve a covering insulted by article of the present invention and without having thermal shorts directly through any extruded polymer foam section of the article. Article 500 has two cavity foams 120 offset from one another so their cavities 125 partially overlap. Cavities 125 are enclosed with extruded polymer foam sheets or boards 110. Portions 520 and 540 of article 500 act as half-laps that can mate with one another in adjoining boards. Desirably, each cavity 125 contains and more desirably is entirely filled with a VIP. Alternatively one or combination of more than one cavity 125 can contain and/or be filled with a VIP.

Foam components that enclose the cavity of an article of the present invention can be loosely placed together, adhered together with, for example, adhesive tape or an adhesive (such as GREAT-STUFF® brand polyurethane adhesive, GREAT-STUFF is a trademark of The Dow Chemical Company) or mechanically held together. The VIP within a cavity can also be adhered to the extruded thermoplastic polymer foam in which the cavity is defined, an extruded thermoplastic polymer foam enclosing the cavity, or both. Adhering components of the article to one another is desirable to maintain integrity of the article during handling and use.

The article of the present invention desirably offers a superior combination of durability and thermal insulating properties than any of the extruded thermoplastic polymer foam or VIP. The article of the present invention desirably has a thermal conductivity of 35 milliWatts per meter per Kelvin (mW/m*K) or less, preferably 30 W/m*K or less, still more preferably 25 mW/m*K or less, yet more preferably 20 mW/m*K or less, even 15 mW/m*K or less and most preferably 10 mW/m*K or less. Determine thermal conductivity according to ASTM C578.

Any single cavity of an article of the present invention can contain one or more than one additional material, including one or more than one additional thermally insulating material, in addition to or instead of a VIP provided at least one cavity contains a VIP. One type of desirable additional material is a reflective material such as a metal foil or reflective coating, which further reduces thermal conductivity through the final article.

The article of the present invention can have edges that have specific profiles or shapes. For example, opposing edges of the article can have mating tongue and groove shapes or opposing laps to coordinate positioning multiple articles next to one another in a mating fashion. Profiling of the edges can be done by machining or molding and can be done before or after defining cavities and/or introduction of VIP into a cavity of the article.

The article can have a planar surface or a contoured surface. In one embodiment, the article has a primary surface that defines grooves extending in at least one dimension, typically the length dimension. Grooves are desirable in applications where, for example, a coating material (for example, mortar or cement) will be applied over the article because the coating material can penetrate into the grooves and achieve better mechanical adhesion to the article.

In general, prepare an article of the present invention by providing an extruded thermoplastic polymer foam that defines at least one cavity, providing a VIP and inserting the VIP into a cavity defined by the extruded thermoplastic polymer foam.

Prepare extruded thermoplastic polymer foam in any manner. It is common to prepare extruded thermoplastic polymer foam by first forming a softened polymer composition in an extruder. The polymer composition has a continuous thermoplastic polymer phase that has a softening temperature. The thermoplastic polymers are as described above for the thermoplastic polymers of the extruded thermoplastic polymer foam. Prepare the softened polymer composition by heating the polymer composition to a temperature above its softening temperature (glass transition temperature for amorphous polymers, melting temperature for semi-crystalline polymers, and the highest glass transition temperature or melting temperature represented by thermoplastic polymers continuous in the polymer composition if there is a blend of thermoplastic polymers). If blowing agent is not already present, introduce a blowing agent into the softened polymer composition at an initial pressure that is sufficiently high so as to preclude foaming of the polymer composition in order to form a foamable polymer composition. It is often desirable to cool the foamable polymer composition to a foaming temperature that is still above the softening temperature of the polymer composition and then extrude the foamable polymer composition into an environment having a pressure lower than the initial pressure and a temperature lower than the foaming temperature. Allow the foamable polymer composition to expand into extruded thermoplastic polymer foam.

Suitable blowing agents for preparing the extruded thermoplastic polymer foam include any one or combination of more than one of the following: inorganic gases such as carbon dioxide, argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); fully and partially halogenated polymers and copolymers, desirably fluorinated polymers and copolymers, even more preferably chlorine-free fluorinated polymers and copolymers; aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate. In a desirable embodiment, the blowing agent is free of chlorinated blowing agents and more preferably free of halogenated blowing agents. Halogenated blowing agents, particularly chlorinated blowing agents, have a stigma of having an undesirable affect on the environment. Therefore, a blowing agent that is free of chlorinated or halogenated blowing agents is desirably as being more environmentally acceptable.

Using carbon dioxide as a blowing agent, or one of multiple blowing agents, is desirable to form polymer foam having cells with a cell pressure that is at least temporarily below atmospheric pressure. Carbon dioxide escapes from a polymer foam more rapidly than air permeates into the polymer foam cells. As a result, polymer foam cells blown with carbon dioxide have a pressure below atmospheric pressure after carbon dioxide escapes and until air permeates in to replace the pressure formerly provided by the carbon dioxide.

The extruded thermoplastic polymer foam defines at least one cavity. Define cavities into extruded thermoplastic polymer foam in any conceivable way. Suitable means of defining a cavity include routing, assembling multiple extruded foam components together in a way that define one or more cavity, and cold forming and/or hot forming by compressing to form one or more than one depression. It is within the scope of the present invention to combine multiple extruded thermoplastic polymer foam elements together to define one or more than one cavity as described with the article of the present invention for the extruded thermoplastic polymer foam. The extruded thermoplastic polymer foam elements can have the same composition and properties or different composition and/or properties. Another method of introducing a cavity is to make a cut into extruded thermoplastic polymer foam so as to create a flap of foam and then removing a portion of the extruded thermoplastic polymer foam under the flap. The flap then can serve as a cover to seal the cavity and its contents.

Extruded thermoplastic polymer foam can define a cavity in any surface, but typically defines one or more cavity in a primary surface of the extruded thermoplastic polymer foam. The cavity or cavities can have any size or shape within the dimension of the extruded thermoplastic polymer foam. Typically, the cavity (or cavities) has dimensions exceeding ten or even exceeding 100 cell dimensions. To be clear, the cells of the foam are not "cavities" in a foam within the use of the term herein but rather characteristics of a polymer matrix that cause the polymer matrix to be a foam. Cavities defined by the foam are defined by the cellular polymer matrix, which necessarily includes foam cells.

One particularly desirable method for defining a cavity, or multiple cavities, in a polymer foam is by using a cold forming process. United States patent application US2009/0062410A1 (incorporated herein in its entirety) provides a general description of a cold forming process. To introduce a cavity by cold forming, press a molding projection into a polymer foam article at a temperature below the softening temperature of the polymer foam article, typically at or near ambient temperature (approximately 25° C.), hence the name "cold" forming.

Cold forming offers a particularly desirable article of the present invention because compressing the polymer foam article to form cavities densifies the portion of foam between the cavity and the outer surface of the foam opposite the foam surface into which the cavity is impressed. That densified portion beneficially has a higher durability than surrounding non-compressed foam and thereby offers improved protection of a VIP that resides in the cavity of the final article from forces applied from outside the foam. The densified portion also serves as a better vapor barrier than non-densified extruded thermoplastic polymer foam, thereby protecting a VIP within a cavity of the foam from water vapor in the atmosphere around the thermoplastic foam article containing the VIP. Water vapor tends to degrade VIP insulating value by permeating through the VIP's barrier material and into VIP article.

Ideally for cold forming cavities, use an extruded thermoplastic polymer foam having any one, any combination of two, three or all four of the following characteristics: (a) a cell pressure (pressure within the cells of the foam) that is below one atmosphere, preferably 0.75 atmospheres or less; (b) higher open cell content proximate to a surface impressed by a mold to form a cavity (that is, an "impression surface") than proximate to a surface opposing the impression surface, preferably having a graduated open cell content; (c) a lower density proximate to an impression surface than proximate to a surface opposing the impression surface, preferably having a graduated density; and (d) an anisotropic compressive balance with a higher compressive balance in the dimension of compression than dimensions orthogonal to compression. The first characteristic (cell pressure) facilitates compression without fracturing foam surrounding the compressed portions of foam. The advantages of (b) and (c) are set forth above in discussing extruded polymeric foam properties. The benefit of (d) is that it promotes plastic versus elastic buckling of cell walls during cold forming compression.

Provide a VIP and place it into a cavity defined by the extruded thermoplastic polymer foam. It is acceptable to place more than one VIP into a single cavity and to place VIPs into more than one cavity of an extruded thermoplastic polymer foam. The VIP, or VIPs, can be the sole element in any given cavity of the extruded thermoplastic polymer foam. Alternatively, additional elements including aerogels and metal foils can reside in a cavity with the VIP.

Articles of the present invention are particularly useful as thermal insulating materials. One method of using an article of the present invention is to provide the article and then position the article as a barrier between two different areas. For example, position articles of the present invention on a wall of a building structure to thermally insulate the inside of the structure from the outside of the structure. As another example, position the articles of the present invention as walls around a container to thermally insulate the inside of the container from the outside of the container.

EXAMPLES

The following examples serve to further illustrate specific embodiments of the present invention.

Method for Producing Cavity Foam

Provide an extruded polystyrene (XPS) foam plank (110 mm thick, 600 mm wide, 2200 mm long) that has an anisotropic compressive balance with a high vertical compressive balance, a density gradient of about 19% from core to surface (core has a density 19% lower than the surface) and an open cell content gradient such that the core is has a higher open cell content than the surface. The foam was prepared without halogenated blowing agent and, therefore, is free of halogenated blowing agents. One such foam is IIVIPAXX™ 300 brand energy absorbing foam (IMPAXX is a trademark of The Dow Chemical Company) prepared using carbon dioxide and isobutane as a blowing agent composition and that has aged at least eight months. The foam has an average density of 37 $kg/m^3$ (method ASTM D1622), vertical compressive strength of 384 kPa according to EN-826 and a thermal conductivity of 34.2 mW/m*K according to ASTM C578.

Cut the planks lengthwise (parallel to a primary surface) through the middle of the plank's thickness dimension to create two foam boards having a thickness of approximately 55 mm. The cut surfaces reveal the core of the foam, which has a lower density and higher open cell content than the uncut opposing surface, and serve as forming surfaces for the foams. Remove the skin of the uncut surface opposite the cut surface (forming surface) to a depth of 7 mm. Cut the length to 600 mm to produce a cold forming foam blank having a length and width of 600 mm and a thickness of 55 mm.

Provide a cavity forming molding tool that has dimensions of 500 mm by 500 mm by 40 mm thick. Mount the cavity forming molding tool to a moving platen on a Walter Pressen compression molding machine (1000 kN). Position a cold forming foam blank on the stationary platen of the compression molding machine with the forming surface facing the cavity forming molding tool. With the cold forming foam blank and cavity forming molding tool at ambient temperature (approximately 25° C.), compress the cavity forming molding tool into the center of a 600 mm×600 mm surface of the cold forming foam blank at a rate of approximately 10 mm/minute until the molding tool depresses 20 mm into the cold forming foam blank. Retract the cavity forming molding tool from the foam to reveal a "cavity foam"—an extruded thermoplastic polymer foam having dimensions of 600 mm×600 mm×55 mm and defining a cavity having dimensions of 500 mm×500 mm×20 mm into one primary surface of the foam. The portion of foam between the cavity and surface opposing the surface into which the compression is defined is of higher density than the average density of the foam due to compression of the foam into this space. The density of the compressed portion between the cavity and surface opposing the surface into which the compression is defined has a density of approximately 370 $kg/m^3$ versus a density of approximately 37 $kg/m^3$ for the remaining non-densified portion of foam. This densified portion of the foam serves as an enhanced barrier to water vapor permeability and a reinforced layer to protect a VIP that may reside in the cavity.

Figure 4:
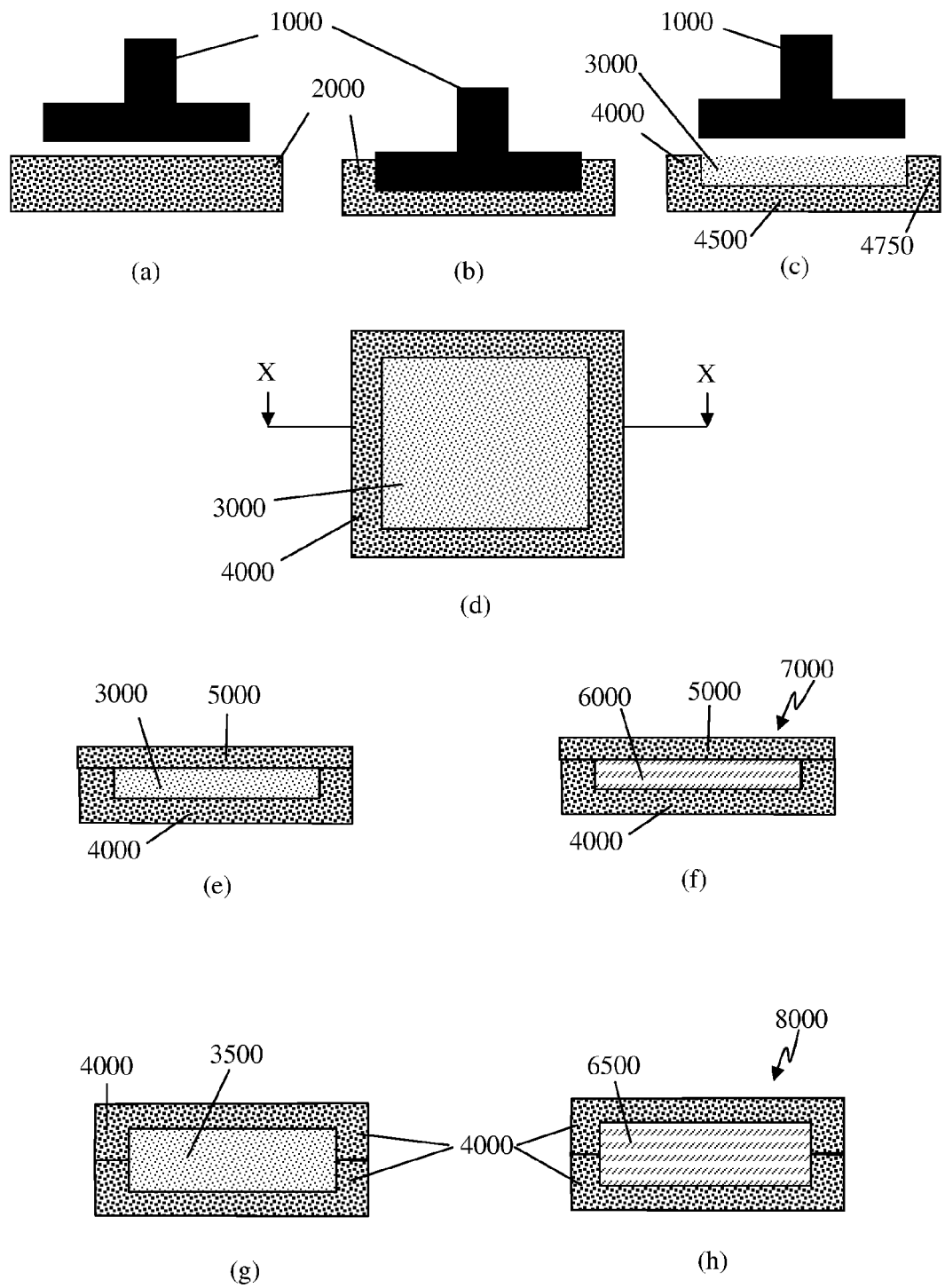
FIGS. 4a-h illustrates cold forming formation of a cavity in extruded thermoplastic polymer foam and two embodiments of articles of the present invention.

FIG. 4 generally illustrates this process. FIG. 4(*a*) illustrates a cross sectional view of extruded thermoplastic polymer foam 2000 and cavity forming molding tool 1000 prior to cavity formation. FIG. 4(*b*) illustrates cavity molding tool 1000 compressed into foam 2000. FIG. 4(*c*) illustrates cavity molding tool 1000 retracted from foam 2000 leaving cavity 3000 to create cavity foam 4000. Portion 4500 of cavity foam 4000 has a higher density than portion 4750 of cavity foam 4000, and hence a higher density than cavity foam 4000 on average. FIG. 4(*d*) illustrates a top view (looking down onto cavity 3000) of cavity foam 4000. Notably, the process steps of FIGS. 4(*a*)-(*c*) are as viewed in cross sectional character along viewing line X.

Comparative Example A

Provide a cavity foam and enclose the cavity with a second piece of foam (a "lid foam") having a length and width of 600 mm and a thickness of 25 mm, which is cut from an extruded polystyrene foam plank similar to the cavity foam to produce Comparative Example (Comp Ex) A. FIG. 4(*e*) generally illustrates a cross sectional view of Comp Ex A with lid foam 5000 overlaying cavity foam 4000 to totally enclose cavity 3000.

Comparative Example B

Prepare another article similar to Comp Ex A except include an extruded polystyrene foam board having a width and length of 500 mm and a thickness of 20 mm in the cavity of the article so as to completely fill the cavity. The extruded polystyrene foam board filling the cavity is cut from the same foam material as the lid and cavity foam. Comp Ex B is similar to article 7000 in FIG. 4(*f*) except VIP 6000 is an extruded polystyrene foam board.

Example 1

Prepare a foam article similar to Comp Ex A except enclose within the cavity a VIP having a width and length of 500 mm and a thickness of 20 mm (for example, Va-Q-Vip, available form Va-Q-Tec GmbH). The VIP has a thermal conductivity of 4.5 mW/m*K). FIG. 3(*f*) generally illustrates Example (Ex) 1 as article 7000 with cavity foam 4000, lid foam 5000 and VIP 6000 in cavity 3000 (not shown since occupied by VIP 6000).

Example 2

Repeat Example 1 using a VIP having a thermal conductivity of 4.2 mW/m*K)

Comparative Example C

Provide two cavity foams and fit them together with their cavities facing one another so as to form a square article (Comp Ex C) having a width and length of 600 mm and a thickness of 110 mm with a totally enclosed cavity having a width and length of 500 mm and a thickness of 40 mm centered within the article. Comp Ex C is generally illustrated in FIG. 5(*g*), which illustrates two mating cavity foams 4000 with one inverted and positioned on top of the other so as to totally enclose cavity 3500.

Comparative Example D

Prepare another article similar to Comp Ex C except include an extruded polystyrene foam board having a width and length of 500 mm and a thickness of 40 mm in the cavity of the article so as to completely fill the cavity. The extruded polystyrene foam board filling the cavity is cut from the same foam material as the lid and cavity foam.

Example 3

Prepare a foam article similar to Comp Ex C except enclose within the cavity a VIP having a width and length of 500 mm and a thickness of 40 mm (for example, Va-Q-Vip, available form Va-Q-Tec GmbH). The VIP has a thermal conductivity of 4.1 mW/m*K). Example 3 is generally illustrated (in cross sectional view) as article 8000 of FIG. 4(*h*). Article 8000 contains VIP 6500 filling cavity 3500 (not shown) enclosed by mating cavity foams 4000.

Example 2

Repeat Example 3 using a VIP having a thermal conductivity of 3.5 mW/m*K).

The two foam components of the Comparative Example and Examples that enclose the cavity of each article can be loosely placed together, adhered together using for example adhesive tape or an adhesive (such as GREAT-STUFF® brand polyurethane adhesive, GREAT-STUFF is a trademark of The Dow Chemical Company) or mechanically held together with fasteners all with similar thermal conductivity results.

Measure the thermal conductivity of each of the articles at 10° C. according to method ASTM C578. Table 1 provides thermal conductivity results for comparative purposes.

TABLE 1

| Article | Description | Thickness (mm) | Thermal Conductivity (mW/m*K) |
|---|---|---|---|
| Comp Ex A | 20 mm empty cavity | 80 | 41 |
| Comp Ex B | 20 mm cavity filled with XPS | 80 | 33 |
| Ex 1 | 20 mm cavity with 4.5 mW/m*K VIP | 80 | 14 |
| Ex 2 | 20 mm cavity with 4.1 mW/m*K VIP | 80 | 12 |
| Comp Ex C | 40 mm empty cavity | 110 | 46 |
| Comp Ex D | 40 mm XPS filled cavity | 110 | 33 |
| Ex 3 | 40 mm cavity with 4.1 mW/m*K VIP | 110 | 9 |
| Ex 4 | 40 mm cavity with 3.5 mW/m*K VIP | 110 | 8 |

The comparative examples having an empty cavity spaces (Comp Exs A and C) have the highest thermal conductivities due to the freedom for air convection to occur in the cavities. The comparative examples having XPS foam in the cavities (Comp Exs B and D) have thermal conductivities that approximate that of bulk XPS foam (35 mW/m*K) prior to any processing.

In contrast, the examples comprising VIPs enclosed within the cavities have dramatically lower thermal conductivities than the bulk XPS foam surrounding the VIPs. The articles of each Example comprise a VIP enclosed and protected by XPS foam. Moreover, the articles of each Example have added protection by a densified portion of XPS foam between the cavity containing the VIP and the outside surface of the XPS foam that arises by cold forming the cavities in the XPS foam. This higher density portion of foam inherently has higher compressive strength than non-densified portions of foam.

Examples 1-4 illustrate articles of the present invention and the dramatically low thermal conductivities they can provide while having an appearance of an extruded thermoplastic polymer foam (such as an extruded XPS foam).

As is characteristic of articles of the present invention, edges of the articles of each example can be cut to fit the article into custom spacings or milled to assume mating or desirable profiles (for example, tongue and groove or lapping shapes) without damaging the VIP or thermal conductivity of the article.

The invention claimed is:

1. An article comprising:
   a. an extruded thermoplastic polymer foam that has a thermoplastic polymer matrix defining a multitude of cells, the extruded thermoplastic polymer foam defining at least one cavity; and
   b. a vacuum insulation panel residing entirely within at least one cavity of the extruded thermoplastic polymer foam wherein the vacuum insulation panel comprises a flexible barrier material enclosing a volume that is under vacuum and occupied by an open-celled polymeric foam core material;

wherein the portion of the foam residing between the cavity containing the vacuum insulation panel and a surface of the extruded thermoplastic polymer foam has a higher density than the extruded thermoplastic polymer foam on average.

2. The article of claim 1, wherein the article comprises multiple vacuum insulation panels entirely enclosed within extruded polymeric foam.

3. The article of claim 2, wherein the article comprises a first set of multiple vacuum insulation panels next to one another and residing in a first plane of the article and a second set of multiple vacuum insulation panels positioned so to overlap two or more vacuum insulation panels of the first set and residing in the article in a position other than in first plane.

4. The article of claim 1, wherein the extruded thermoplastic polymer foam is free of halogenated blowing agents and has a thermal conductivity of 25 milliWatts per meter per Kelvin or less.

5. A process for preparing the Article of claim 1, the process comprising: (a) providing a first extruded polymeric foam having a cavity defined therein and having a portion of the foam residing between the cavity and a surface of the first extruded thermoplastic polymeric foam has a higher density than the extruded thermoplastic polymer foam on average; and (b) placing a vacuum insulation panel entirely within the cavity.

6. The process of claim 5, wherein step (a) includes extruding the polymer foam in an absence of halogenated blowing agent.

7. The process of claim 5, wherein step (a) includes defining a cavity into the extruded polymeric foam by cold forming the cavity.

8. The process of claim 5, further comprising: (c) placing a second extruded polymeric foam over the vacuum insulation panel so as to enclose the vacuum insulation panel with extruded polymeric foam between the first and second extruded polymeric foams.

9. The process of claim 8, wherein the second extruded polymeric foam of step (c) has a cavity defined therein that mates with the cavity defined in the first extruded polymeric foam so as to create an enclosed cavity within the two extruded polymeric foams wherein the vacuum insulation panel resides.

10. The process of claim 5, wherein the extruded polymeric foam in step (a) has multiple cavities defined therein, step (b) includes introducing a vacuum insulation panel into more than one cavity and step (c) includes enclosing each vacuum insulation panel in extruded polymeric foam.

11. The process of claim 10, wherein the second extruded polymeric foam of step (c) has multiple cavities defined therein that mate with the cavities defined in the first extruded polymeric foam so as to create multiple enclosed cavities within the two extruded polymeric foams wherein the multiple vacuum insulation panels reside.

* * * * *